Sept. 20, 1966 A. TRIESCHMANN 3,273,732

SELF-LOADING VEHICLE AND DUMP GATE THEREFOR

Filed Nov. 23, 1964 4 Sheets-Sheet 1

INVENTOR
ALFRED TRIESCHMANN

Fraser & Fraser

ATTORNEYS

SELF-LOADING VEHICLE AND DUMP GATE THEREFOR
Filed Nov. 23, 1964 4 Sheets-Sheet 2
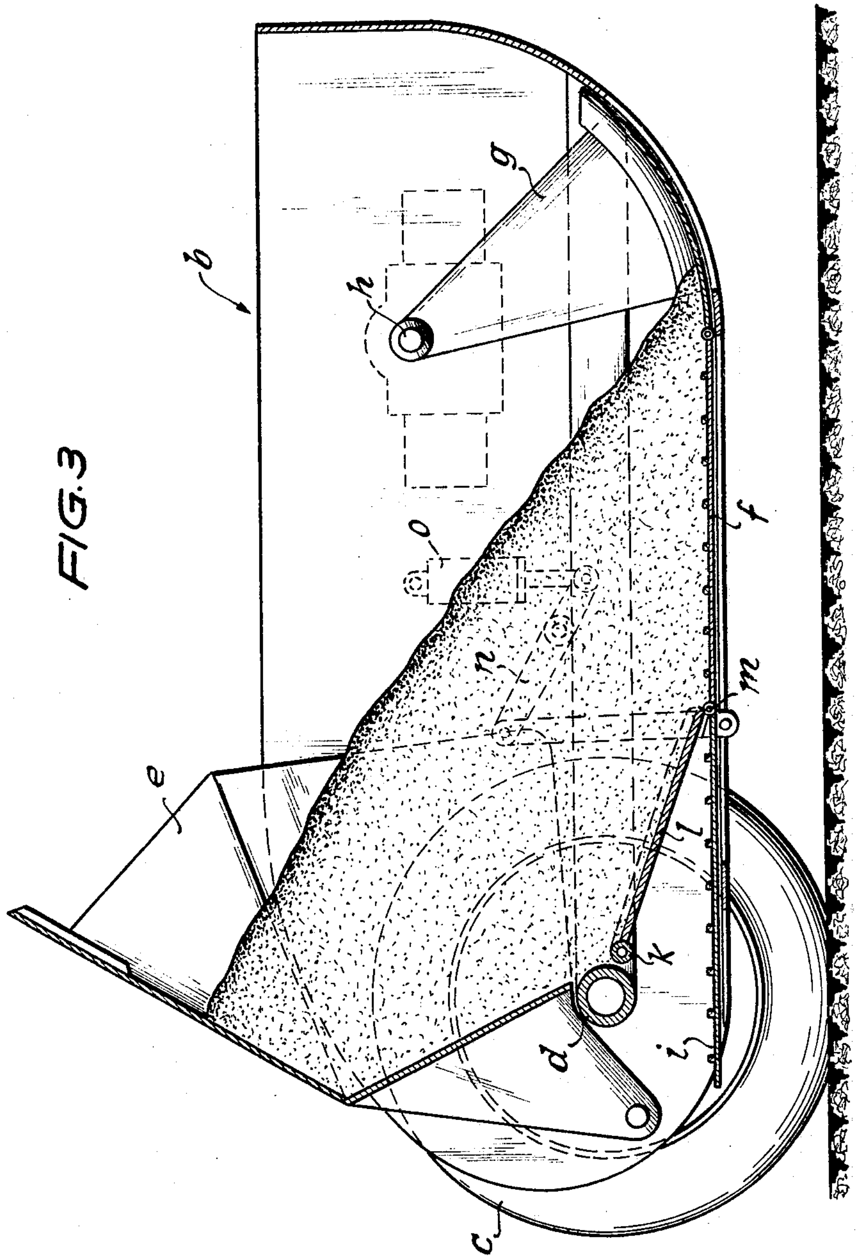
INVENTOR
ALFRED TRIESCHMANN
Fraser & Fraser
ATTORNEYS SELF-LOADING VEHICLE AND DUMP GATE THEREFOR
Filed Nov. 23, 1964 4 Sheets-Sheet 3
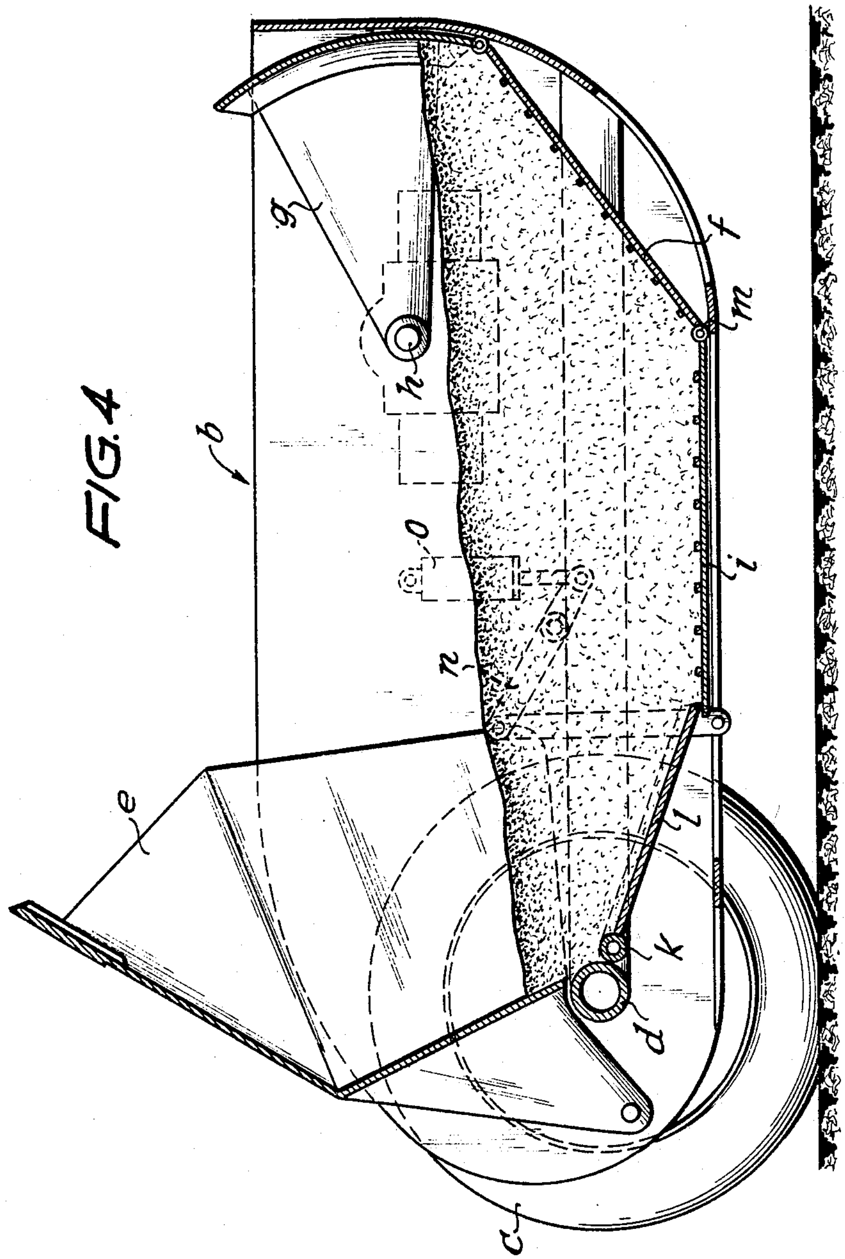
INVENTOR
ALFRED TRIESCHMANN
Fraser & Fraser SELF-LOADING VEHICLE AND DUMP GATE THEREFOR
Filed Nov. 23, 1964 4 Sheets-Sheet 4
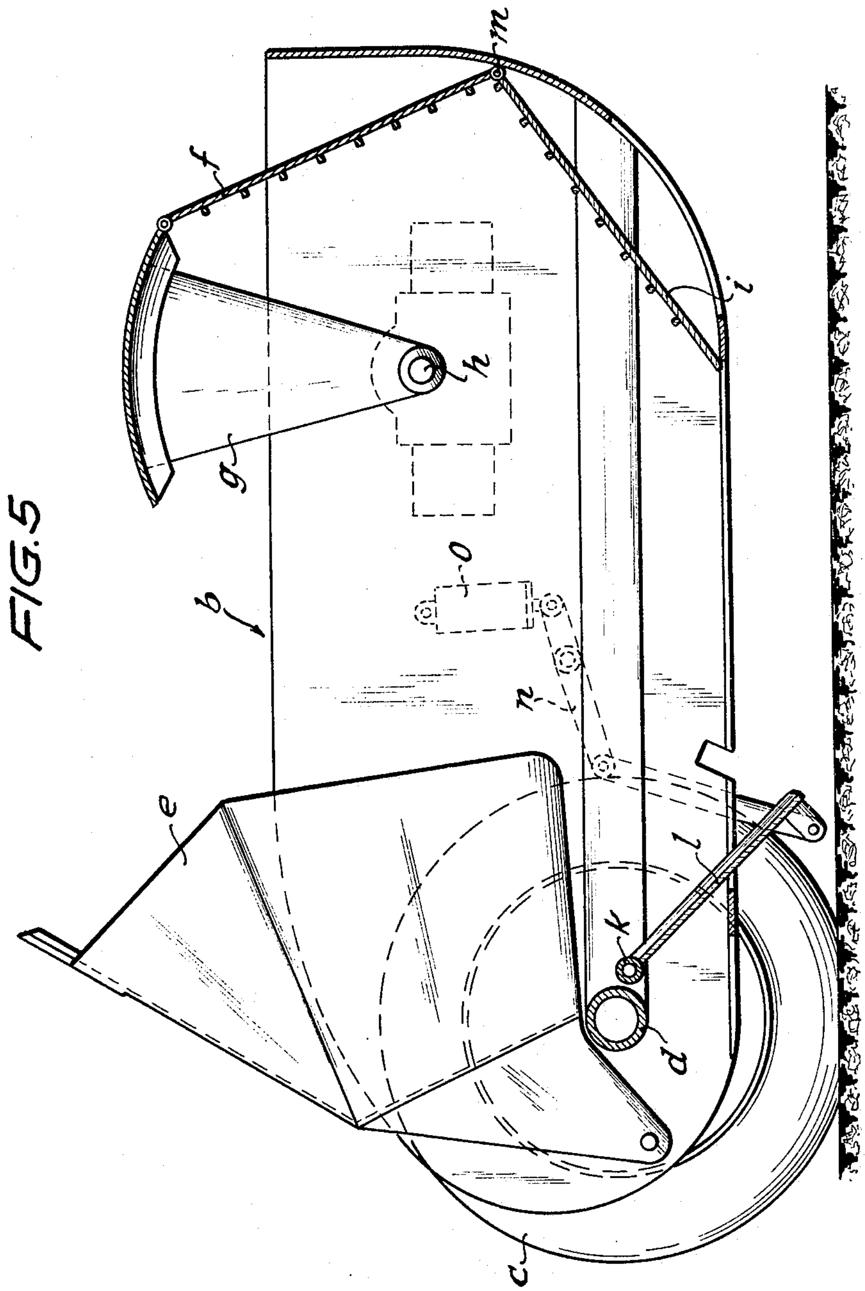
INVENTOR
ALFRED TRIESCHMANN
Fraser & Fraser
ATTORNEYS United States Patent Office 3,273,732
Patented Sept. 20, 1966

3,273,732
SELF-LOADING VEHICLE AND DUMP GATE THEREFOR

Alfred Trieschmann, Philippsthal, Germany, assignor to Vereinigte Kaliwerke Salzdetfurth AG., a corporation of Germany Filed Nov. 23, 1964, Ser. No. 413,007
Claims priority, application Germany, Nov. 25, 1963, V 24,919
7 Claims. (Cl. 214—518)

The invention relates to a loading machine consisting of an engine unit and a loader unit comprising a load space to be filled by a loader bucket working ahead and being upwardly pivotable after each loading, and the load space being emptied by freeing an aperture in its base. The invention deals more particularly with fundamentally known forms of construction of such bucket loaders, wherein the base aperture is freed by longitudinal displacement of a displaceable region of the base.

Combined loader and transporter vehicles of this kind are used for numerous purposes, more particularly in underground mining works.

They fulfill their task in completely satisfactory fashion, but hitherto known forms of construction exhibit the disadvantage that the angle of inclination of the material emptied into the load space makes it impossible to make full use of the capacity of the load space.

The material introduced by the bucket, which is pivoted upwards and then rearwards, can accordingly fill only a more or less large forward region of the load space, while the rearward region thereof remains at least partially unused.

The invention makes it possible to avoid this disadvantage of known forms of construction. In its basic idea, it resides in that the second part of the closure slider takes the form of a plate which is first of all disposed outside and beneath the base of the load space, and which is articulated to that part of the slider which closes the base in a first phase of loading, and when the load space has been filled up to the amount permitted by the angle of inclination of the material being loaded, displacement of the plate, which has so far formed the base of the container, carries the material with it into the rearward part of the container; in a following phase of filling the said plate forms the base of the load space, and is further displaced to free the base aperture in the unloading phase.

This now gives the prerequisites for further loading the container space until it is almost completely filled. Emptying is then carried out by further displacement of the extended part of the base, the base aperture being freed.

In the first phase, the extended part of the base is articulated to the part forming the base, so that as displacement proceeds that part which first of all forms the base can tilt upwards in the first phase, and in the second phase of displacement both parts of the base then lie at an angle to one another in the immediate vicinity of the rear wall of the container, those regions of the container which cannot be used for filling purposes making up only a fraction of the volume which had to remain unused in the known arrangement in view of the angle of inclination.

It is clear that this design for the closure slider has nothing to do with intrinsically known two-part closure sliders, which are made in two parts in order to allow the two parts to pivot in relation to one another when unloading is in progress, so that when they form a bend with respect to one another they can follow the curve which the slider has to describe.

In order further to improve their driving action on the material, the plate members forming the base may be equipped with transversely directly driving strips or the like.

According to a further essential feature of the invention, there is a flap in the region of the forward end of the load space in the vicinity of the axis about which the loading bucket is pivoted upwards, which flap extends up to that point on the base at which the extended part of the latter is articulated to the region which first of all forms part of the base, the material in the relevant part of the container resting on the said flap in the first and second phases of filling, the said flap being pivoted downwards in the emptying phase while the base aperture is further enlarged, preferably by a suitable drive, and before the parts of the base of the emptied load space are run back the said flap is pivoted in again.

The fact that this plate thus extends relatively far into the load space gives a considerably longer space beneath the said plate than in the known embodiment, which space can be extended correspondingly with the length of the part of the base which is in reserve beneath the flap in the first phase.

Downwardly pivotable flaps which first of all form part of the base of the load space and are lowered when the load space is being emptied are known in loading machines of the kind under consideration, but not with the purpose hereinbefore characterised of accommodating beneath the flap the second part of the closure slider forming the base of the load space, and as a result extending the path of the slider for conveying the material loaded in the rearward region of the load space.

A preferred form of embodiment of a loader and transporter vehicle with the features of the invention is illustrated in the drawing, all details not necessary to an understanding of the invention being omitted.

FIGURE 3 shows a vertical longitudinal section on a larger scale in the first phase of loading, and FIGURE 4 shows a corresponding illustration of the condition at the beginning of the second phase of loading.

FIGURE 5 shows the final phase of unloading.

Figure 1:
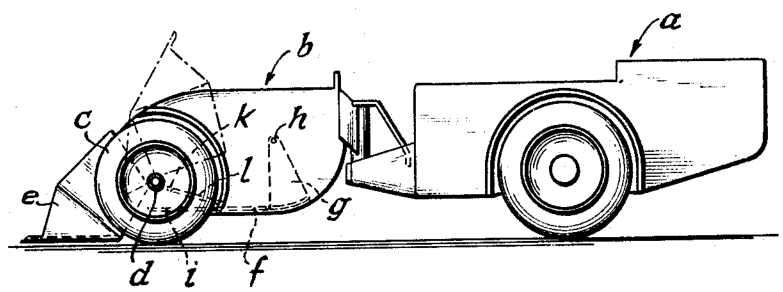
FIGURES 1 and 2 show a self-loading vehicle with the features of the invention, purely diagrammatically and in lateral elevation and plan view.
Figure 2:
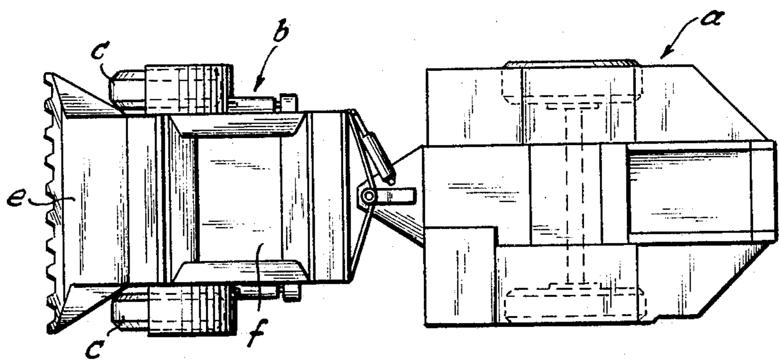

The loader and transporter vehicle illustrated in FIGURES 1 and 2 consists of the engine unit *a* and the loader unit *b* coupled thereto in appropriate fashion.

The loader unit *b* is movable on wheels *c*, as also is the engine unit *a*. The axle *d* of the wheels of the loader unit also forms the pivoting spindle for the loader bucket *e* of intrinsically known construction. The middle region of the base of the load space is formed by a plate member *f* articulated to a sector *g* which is mechanically pivotable about a fixed spindle *h*. An extension piece *i* extends forwards from the part *f* of the base in the direction thereof, and is articulated thereto. Furthermore, a flap which forms part of the base is articulated at *k* in the vicinity of the spindle *d* about which the bucket is pivoted, and the forward terminating edge of the said flap rests on the base in the region of the articulation point *m* of the rearwardly extending and first of all free part *i* of the base.

Those parts of the overall arrangement which are essential to the invention may be seen more clearly from FIGURES 3 to 5.

FIGURE 3 reveals the state of filling which can be attained in the first phase, in which the part of the base *f* which is directly articulated to the sector *g*, and can be displaced by pivoting the latter, forms the base closure.

Pivoting the sector *g*, with resultant displacement of the part *f* of the base, imparts motion to the loaded material resting on the said part and imparts a flow to the loaded material carried by the flap *l*, with the result that the material is caused to assume the distribution apparent from FIGURE 4, i.e. the whole upper region on the left-hand side of the load space is freed by moving the material into the right-hand region of the load space, whereupon filling may now be carried on up to the limit determined by the angle of inclination which is then newly formed—in the result making practically full use of the load space.

In the unloading phase, further pivoting of the sector *g* displaces the part *i* of the base so that it makes an angle with the foregoing part *f*, and until the base aperture is fully freed. The resultant position of the sector *g* and of the two base-plates *f* and *i* may be seen from FIGURE 5.

In the phases shown in FIGURES 3 and 4, the flap *l* is in the same position, and forms the base of the load space in the left-hand side thereof as shown in the figure.

The flap may be pivoted downwards in the emptying phase by a bell-crank rod system *n* and by means of a hydraulic cylinder *o* (FIGURE 5) or any other appropriate mechanically or manually actuated device which may be used instead thereof, and subsequently swivelled back into the position shown in FIGURE 2, before the parts of the base are moved back.

The advantages attained by designing the load space in accordance with the invention do not require any further explanation in view of the above.

The invention is naturally not confined to the form of embodiment hereinbefore described in detail and illustrated in the figures, but on the contrary alterations may be made without departing from the basic idea of the invention.

I claim:

1. A material loading and unloading machine comprising in combination, a body unit defining a receptacle for receiving said material; a bucket member pivotally mounted at one end of said unit for loading material into said receptacle; a slideable closure means for closing a material discharge aperture in the bottom of said unit, said slideable closure means including a first part for closing said aperture in a first position of said closure means, and a second part connected to said first part for closing said aperture in a second position of said closure means; and driving means for moving said closure means from said first to said second position whereby to transfer material from said one end toward the other end of said unit and for further moving said closure means to a third position in which the aperture is open to permit discharge of the material.

2. A material loading and unloading machine comprising in combination a body unit defining a receptacle for receiving said material, a bucket member pivotally mounted at one end of said unit for loading material into said receptacle closure means for closing a material discharge aperture in the bottom of said unit, said closure means including a first part slidably mounted in the bottom of said unit and closing said aperture in a first position of said closure means, a second part pivotally connected to said first part and closing said aperture in a second position of said closure means and driving means pivotally mounted on said unit toward its other end and pivotally connected to said first part, said drive means, upon pivoting, causing said closure means to move from said first to said second position whereby to transfer material from said one end toward the other end of said unit and, upon further pivoting, causing said closure means to move to a third position in which the aperture is open to permit discharge of the material.

3. A machine according to claim 2, wherein said first part is in the form of a plate which in said first position is disposed outside and beneath the bottom of said unit.

4. A machine according to claim 3, and including a flap member forming part of and pivotally mounted on, the bottom of said unit, said flap member being pivoted downwardly during discharge of the material.

5. A material loading and unloading machine comprising in combination a body unit defining a receptacle for receiving said material, a bucket member pivotally mounted at one end of said unit for loading material, into said receptacle, an engine unit coupled to said body unit for driving said bucket into engagement with the material to be loaded, closure means for closing a material discharge aperture in the bottom of said unit, said closure means including a first plate slidably mounted in the bottom of said body unit and closing said aperture in a first position of said closure means, a second plate pivotally connected to said first plate in end-to-end relationship and closing said aperture in a second position of said closure means, a flap member forming part of, and pivotally mounted on, the bottom of said unit, said flap member being pivoted downwardly to increase the effective size of said aperture during discharge of the material, and drive means for moving said closure means from said first to said position whereby to transfer material from said one end toward the other end of said unit and for further moving said closure means to a third position in which the aperture is open to permit discharge of the material.

6. A machine according to claim 5, wherein said second plate is disposed beneath said flap member in the first position of said closure means, and is pulled by said driving means in a direction toward said other end of said unit during movement of the closure means to its second position.

7. A material loading and unloading machine comprising in combination, a wheeled body unit having side and end walls defining a receptacle for receiving said material, a bucket member pivotally mounted on said side walls at one end of said unit for loading material into said receptacle upon upward and backward movement of said bucket, a wheeled engine unit coupled to said body unit for driving said bucket into engagement with the material to be loaded, closure means for closing a material discharge aperture in the bottom of said unit, said closure means including a first plate member slidably mounted in the bottom of the body unit and closing said aperture in a first position of said closure means, a second plate pivotally connected to said first plate in end-to-end relationship and closing said aperture in a second position of said closure means, and drive means including a drive spindle supported in said end walls toward the other end of said body unit and a rotatable drive arm pivotally connected at its outer end to said first plate, the outer end of said arm being movable adjacent said end wall, said drive means, upon angular rotation of said arm, causing said first and second plates to slide on the bottom of said body unit whereby to transfer material from said one end toward the other end of said unit, and, upon further angular rotation of said arm, causing said plates to move to a third position in which the aperture is open to permit the material to be discharged.

References Cited by the Examiner

UNITED STATES PATENTS

| | | | |
|---|---|---|---|
| 2,743,828 | 5/1956 | Hayes | 214—78 |
| 2,816,797 | 12/1957 | Hanson | 298—28 |

GERALD M. FORLENZA, *Primary Examiner.*

ROBERT G. SHERIDAN, *Examiner.*